US009783186B2

(12) United States Patent
Matsushita et al.

(10) Patent No.: US 9,783,186 B2
(45) Date of Patent: Oct. 10, 2017

(54) VEHICLE CONTROL APPARATUS

(71) Applicant: SUBARU CORPORATION, Tokyo (JP)

(72) Inventors: Takafumi Matsushita, Tokyo (JP); Katsuhiro Aoki, Tokyo (JP); Makoto Nakamoto, Tokyo (JP); Yusuke Komatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/175,769

(22) Filed: Jun. 7, 2016

(65) Prior Publication Data
US 2016/0368473 A1 Dec. 22, 2016

(30) Foreign Application Priority Data

Jun. 22, 2015 (JP) ................................. 2015-124631

(51) Int. Cl.
B60W 20/10 (2016.01)
B60W 10/08 (2006.01)
(Continued)

(52) U.S. Cl.
CPC ............. *B60W 20/10* (2013.01); *B60K 35/00* (2013.01); *B60W 10/06* (2013.01); *B60W 10/08* (2013.01); *B60K 2350/352* (2013.01)

(58) Field of Classification Search
CPC ...... B60W 20/00–20/10; B60W 10/06; B60W 10/08; B60W 10/24–10/26; B60K 35/00; B60K 2350/352
(Continued)

(56) References Cited

U.S. PATENT DOCUMENTS 5,534,759 A * 7/1996 Evans ................. B60L 11/1851
180/65.1
2007/0208468 A1* 9/2007 Sankaran ............... B60K 6/445
701/31.4
(Continued)

FOREIGN PATENT DOCUMENTS

JP 2008-157081 A 7/2008
JP 2012-016972 A 1/2012
(Continued)

OTHER PUBLICATIONS

Decision to Grant issued in corresponding Japanese Patent Application No. 2015-124631, dated Oct. 4, 2016.

*Primary Examiner* — Bao Long T Nguyen
(74) *Attorney, Agent, or Firm* — McDermott Will & Emery LLP

(57) ABSTRACT

A vehicle control apparatus includes a first electric motor, a second electric motor, a power storage device, a first consumption amount calculator, a first saving amount calculator, a saving balance calculator, and a display controller. The first consumption amount calculator calculates a first fuel amount consumed by the engine owing to charging when the power storage device is charged. The first saving amount calculator calculates a first fuel amount saved by the engine owing to discharge when the power storage device is discharging. The saving balance calculator calculates, based on the first fuel amount consumed and the first fuel amount saved, a fuel saving balance for each calculation period. The display controller controls, based on the fuel saving balance, fuel saving information to be displayed on a display.

14 Claims, 9 Drawing Sheets

(51) Int. Cl.
*B60W 10/06* (2006.01)
*B60K 35/00* (2006.01)

(58) Field of Classification Search
USPC ........ 701/22, 36; 180/65.2, 65.265; 340/455
See application file for complete search history.

(56) References Cited

U.S. PATENT DOCUMENTS

| | | | |
|---|---|---|---|
| 2010/0194553 A1* | 8/2010 | Mizutani | B60W 20/15 340/438 |
| 2011/0118921 A1* | 5/2011 | Park | B60K 6/48 701/22 |
| 2012/0061163 A1* | 3/2012 | Musser | B60L 11/1816 180/333 |
| 2014/0324317 A1* | 10/2014 | Schilling | B60K 37/02 701/99 |
| 2015/0224979 A1* | 8/2015 | Grenn | B60W 20/00 701/22 |

FOREIGN PATENT DOCUMENTS

| | | |
|---|---|---|
| JP | 2014-177187 A | 9/2014 |
| WO | 2012/056587 A1 | 5/2012 |

\* cited by examiner

VEHICLE CONTROL APPARATUS

CROSS-REFERENCE TO RELATED APPLICATIONS

The present application claims priority from Japanese Patent Application No. 2015-124631 filed on Jun. 22, 2015, the entire contents of which are hereby incorporated by reference.

BACKGROUND

The technology relates to a vehicle control apparatus provided in a hybrid vehicle.

A hybrid vehicle includes an engine and an electric motor as drive sources. In order to improve fuel efficiency of a hybrid vehicle, it is important to encourage a driver in an appropriate driving operation to promote motor travelling by means of an electric motor. A proposal of a display device has been therefore made that calculates fuel saving information on a fuel amount saved owing to motor travelling or other reasons, and displays the fuel saving information on a meter, encouraging a driver in a driving operation that contributes to improvement in fuel efficiency (refer to Japanese Unexamined Patent Application Publication (JP-A) No. 2014-177187).

SUMMARY

The display device as described in JP-A No. 2014-177187 calculates, based on a map of fuel amounts consumed for each vehicle model, the fuel saving information on the fuel amount saved in the motor travelling or on other occasions, and displays the fuel saving information on the meter. However, calculation of the fuel saving information with use of map data involves construction of complicated map data. Such construction of complicated map data may cause an increase in costs of a device that provides display of the fuel saving information.

It is desirable to reduce costs of a device that provides display of fuel saving information.

An aspect of the technology provides a vehicle control apparatus provided in a hybrid vehicle that includes a display. The vehicle control apparatus includes a first electric motor, a second electric motor, a power storage device, a first consumption amount calculator, a first saving amount calculator, a saving balance calculator, and a display controller. The first electric motor is coupled to an engine through a power transmission path. The second electric motor is coupled to one or more wheels through a power transmission path. The power storage device is coupled to the first electric motor and the second electric motor through an electrical conduction path. The first consumption amount calculator calculates, based on electrical power charged in the power storage device and electrical power regenerated by the second electric motor, a first fuel amount consumed by the engine owing to charging when the power storage device is charged. The first saving amount calculator calculates, based on electrical power discharged by the power storage device, a first fuel amount saved by the engine owing to discharge when the power storage device is discharging. The saving balance calculator calculates, based on the first fuel amount consumed and the first fuel amount saved, a fuel saving balance for each calculation period. The display controller controls, based on the fuel saving balance, fuel saving information to be displayed on the display.

DETAILED DESCRIPTION

Figure 1:
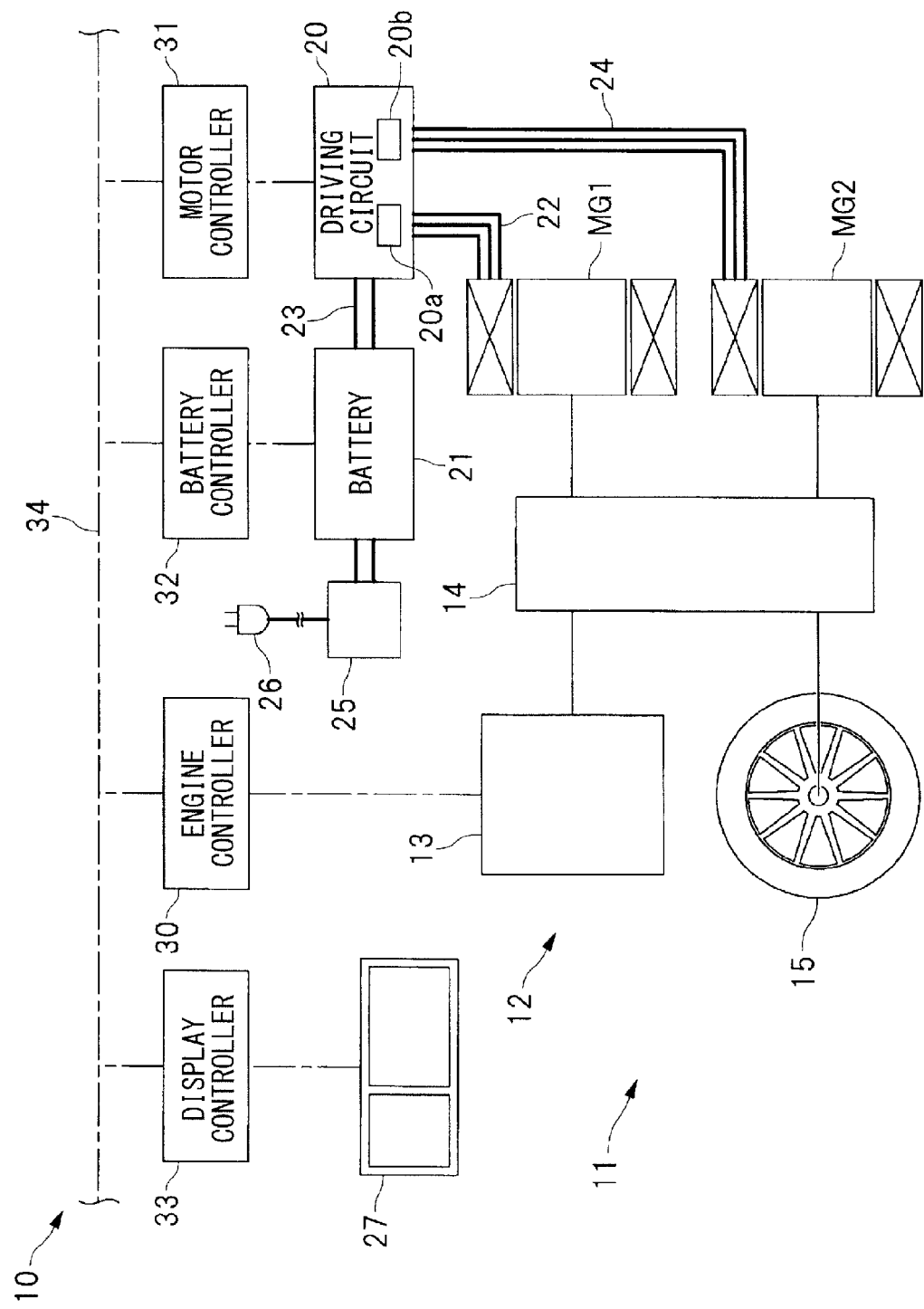
FIG. 1 schematically illustrates a vehicle control apparatus according to an implementation of the technology.

In the following, some implementations of the technology are described in detail with reference to the drawings. FIG. 1 schematically illustrates a vehicle control apparatus 10 according to an implementation of the technology. Referring to FIG. 1, the vehicle control apparatus 10 may be provided in a hybrid vehicle 11. The vehicle control apparatus 10 may include a power unit 12 in which a plurality of drive sources are incorporated. The power unit 12 may include an engine 13, a first motor generator MG1, and a second motor generator MG2. In one implementation, the first motor generator MG1 and the second motor generator MG2 may respectively serve as a "first electric motor" and a "second electric motor". The power unit 12 may be also provided with a power transmission mechanism 14 that may be constituted by, for example, a gear train and a clutch. The engine 13 and the first motor generator MG1 may be coupled together through the power transmission mechanism 14. One or more wheels 15 and the second motor generator MG2 may be coupled together through the power transmission mechanism 14. In one implementation, the power transmission mechanism 14 may serve as a "power transmission path" that couples the engine 13 and the first motor generator MG1 together, and as a "power transmission path" that couples the one or more wheels 15 and the second motor generator MG2 together. Note that the first motor generator MG1 may serve as a power generation motor that is driven mainly by the engine 13. The second motor generator MG2 may serve as a travelling motor that mainly drives the one or more wheels 15. The use of the first motor generator MG1 may allow for start-up revolution or cranking of the engine 13. The use of the second motor generator MG2 may allow for regenerative braking of the one or more wheels 15.

A battery 21 is coupled to the first and the second motor generators MG1 and MG2 through a driving circuit 20 that includes inverters 20a and 20b. In one implementation, the battery 21 may serve as a "power storage device". The first motor generator MG1 and the battery 21 may be coupled together through an electrical conduction path that may be constituted by, for example, electrical conduction cables 22 and 23, and the inverter 20a. Similarly, the second motor generator MG2 and the battery 21 may be coupled together through an electrical conduction path that may be constituted by, for example, electrical conduction cables 23 and 24, and the inverter 20b. A vehicle-mounted charger 25 may be coupled to the battery 21. The vehicle-mounted charger 25 may be provided with a charging connector 26 that is coupled to an undepicted external power supply. In other words, the hybrid vehicle 11 as illustrated may be a plug-in hybrid vehicle, and may allow for charging of the battery 21 with use of the external power supply. The vehicle control apparatus 10 includes a multi-function display 27 that may be incorporated in, for example, an instrumental panel. In one implementation, the multi-function display 27 may serve as a "display". The multi-function display (hereinafter also referred to as a "display") 27 may provide display of, for example, fuel amount saved owing to an engine stop or other reasons, and information on operation of a sideslip prevention device.

As illustrated in FIG. 1, the hybrid vehicle 11 may include a plurality of electronic control units, that is, controllers 30 to 33. The controllers 30 to 33 may include an engine controller 30, a motor controller 31, a battery controller 32, and a display controller 33. The engine controller 30 may control the engine 13. The motor controller 31 may control the first motor generator MG1 and the second motor generator MG2. The battery controller 32 may control the battery 21. The display controller 33 may control the display 27. The controllers 30 to 33 each may include a microcomputer and a driver circuit. The microcomputer may be constituted by a CPU (Central Processing Unit), a ROM (Read Only Memory), a RAM (Random Access Memory), and other components. The driver circuit may generate currents to be supplied to various control devices. The controllers 30 to 33 may be coupled together through a vehicle-mounted network 34 such as a CAN (Control Area Network). The vehicle-mounted network 34 may receive, from undepicted various sensors, control information such as a vehicle speed, the number of revolutions of the engine, the numbers of revolutions of the motors, an amount of an operation of an accelerator, and an amount of an operation of a brake.

[Fuel Amount Saved]

Figure 2:
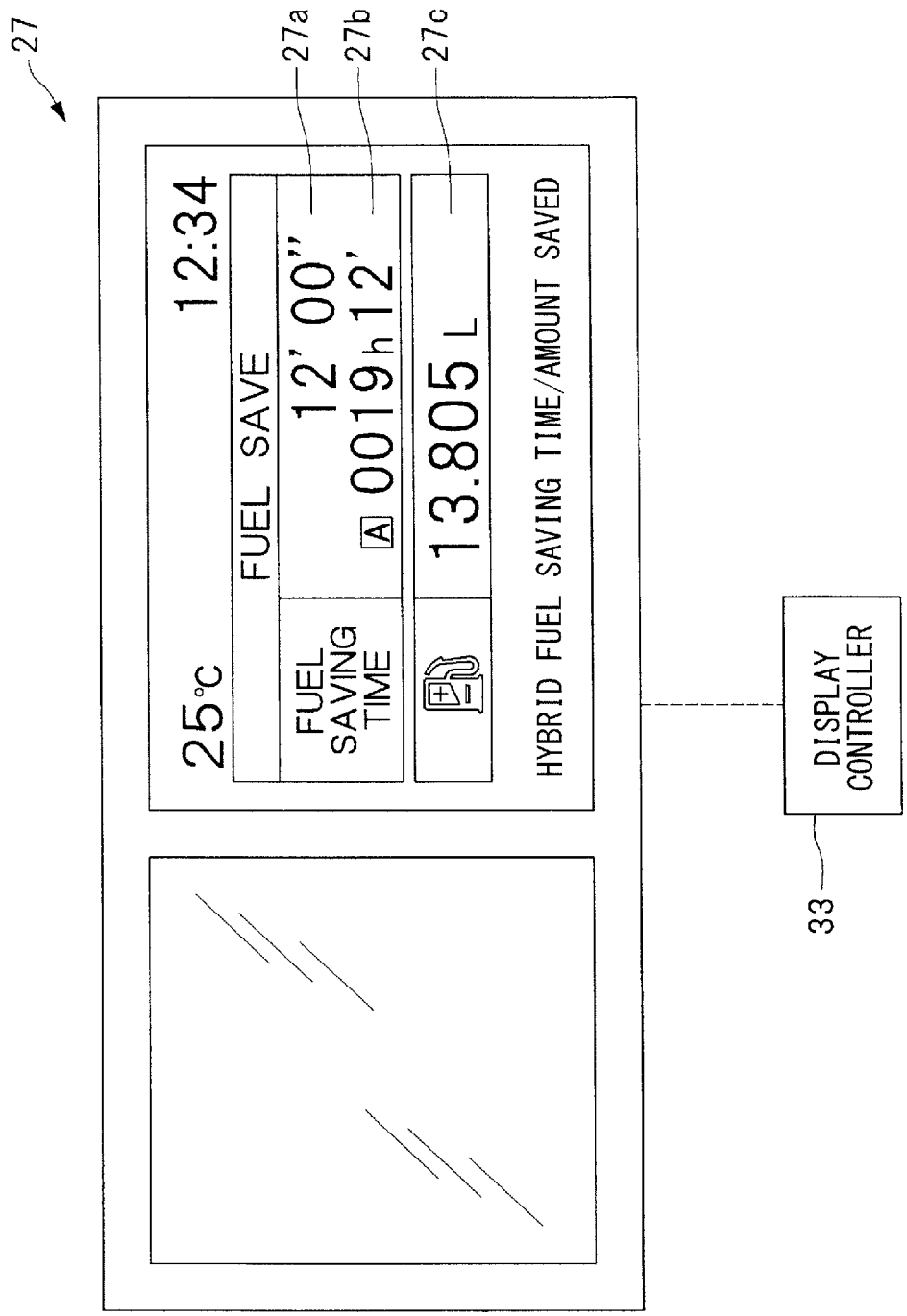
FIG. 2 illustrates an example of display information provided on a display.

Description is given below on display information provided on the display 27. FIG. 2 illustrates an example of the display information provided on the display 27. Referring to FIG. 2, a display region 27a and a display region 27b may be set in the display 27. The display region 27a may provide display of engine stopping time during a vehicle start-up. The display region 27b may provide display of integrated stopping time of the engine 13 that may be integrated until a reset operation is made. A display region 27c may be also set in the display 27. The display region 27c may provide display of a fuel amount saved owing to an engine stop and motor travelling. By allowing the display 27 to provide display of the fuel amount saved, it is possible to enhance a driver's awareness of the fuel amount saved, and to encourage a driver in a driving operation that contributes to fuel saving. Note that the integrated stopping time and the fuel amount saved may be reset in conjunction with a reset operation of an undepicted trip meter.

Figure 3:
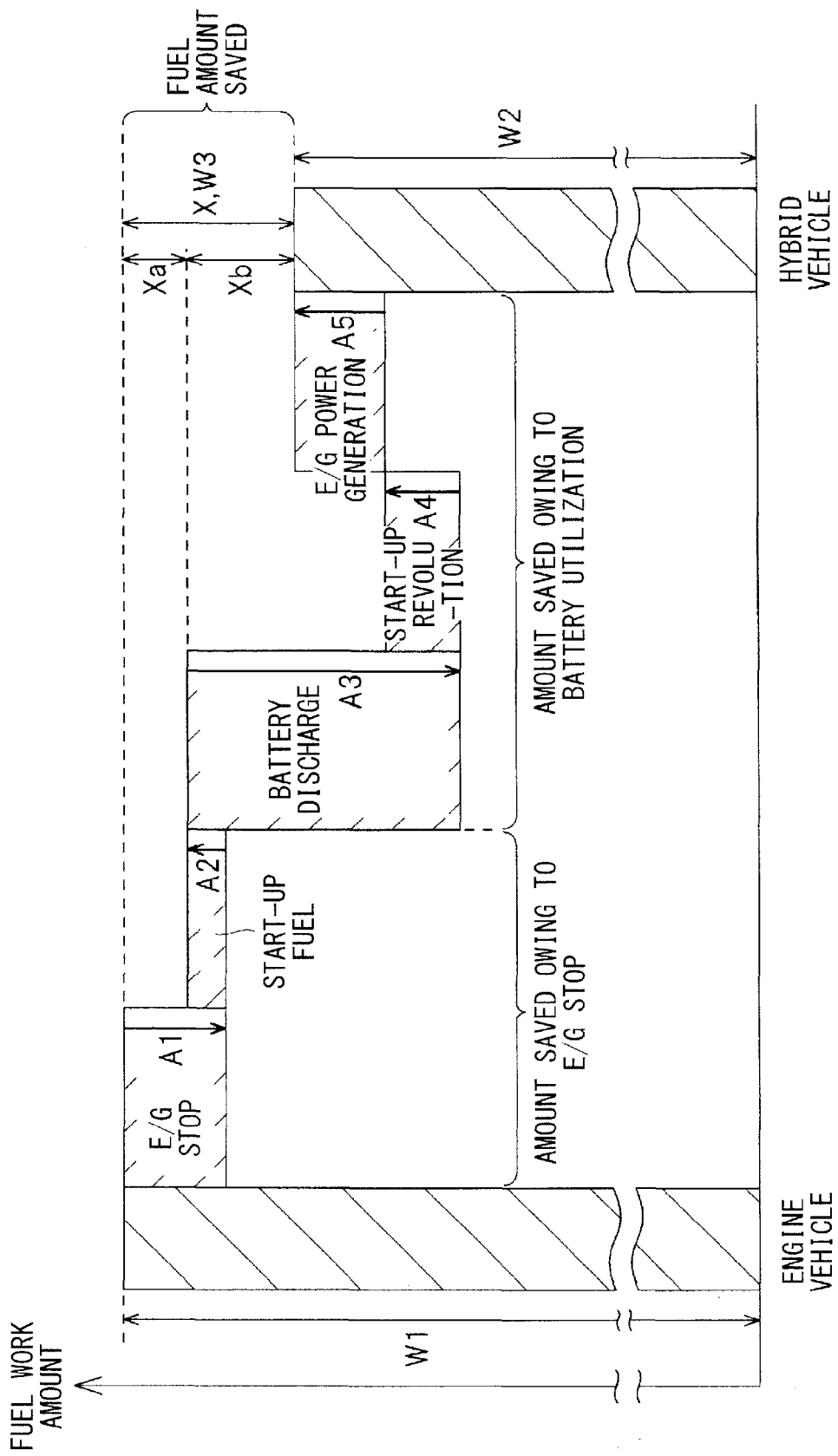
FIG. 3 illustrates details of a fuel amount saved.

FIG. 3 illustrates details of the fuel amount saved. Referring to FIG. 3, the fuel amount saved X may be a value obtained by subtracting a fuel work amount W2 of the hybrid vehicle 11 from a fuel work amount W1 of an engine vehicle that includes solely the engine 13 as a drive source, and converting a fuel work amount W3 obtained by the subtraction to a fuel amount used. Note that a fuel work amount refers to an amount of work done by the engine 13, that is, an amount of work done by means of fuel consumption. As illustrated in FIG. 3, the fuel amount saved X may be constituted by a fuel amount saved Xa owing to an engine stop, and a fuel amount saved Xb owing to battery power utilization.

In the hybrid vehicle 11, the engine 13 is not kept in an idling state. This makes it possible to reduce fuel consumption or the fuel work amount in idling, as compared to a case with the engine vehicle (as denoted by an arrow A1). On the other hand, in the hybrid vehicle 11, the engine 13 may be restarted in accordance with travelling states. This may cause an increase in fuel consumption or the fuel work amount in an engine start-up, as compared to the case with the engine vehicle (as denoted by an arrow A2). As described, since the hybrid vehicle 11 involves positively stopping the engine 13, it is possible to save fuel corresponding to the fuel amount saved Xa, as compared to the case with the engine vehicle.

Moreover, in the hybrid vehicle 11, the second motor generator MG2 may be driven by means of battery power, allowing for reduction in an engine load. Hence, it is possible to reduce fuel consumption of the engine 13, that is, the fuel work amount done by the engine 13, as compared to the case of the engine vehicle (as denoted by an arrow A3). On the other hand, in the hybrid vehicle 11, the first motor generator MG1 may cause cranking of the engine 13, resulting in consumption of battery power in the engine start-up. In other words, power consumption or an amount of work in the engine start-up may increase, as compared to the case with the engine vehicle (as denoted by an arrow A4). Furthermore, in the hybrid vehicle 11, the first motor generator MG1 may be driven for power generation by the engine 13. This may cause an increase in fuel consumption or the fuel work amount in battery charging, as compared to the case with the engine vehicle (as denoted by an arrow A5). Thus, in the hybrid vehicle 11, the engine load may be reduced with use of the battery power. Hence, it is possible to save fuel corresponding to the fuel amount saved Xb, as compared to the case with the engine vehicle.

[Calculation Procedure of Fuel Amount Saved]

Figure 4:
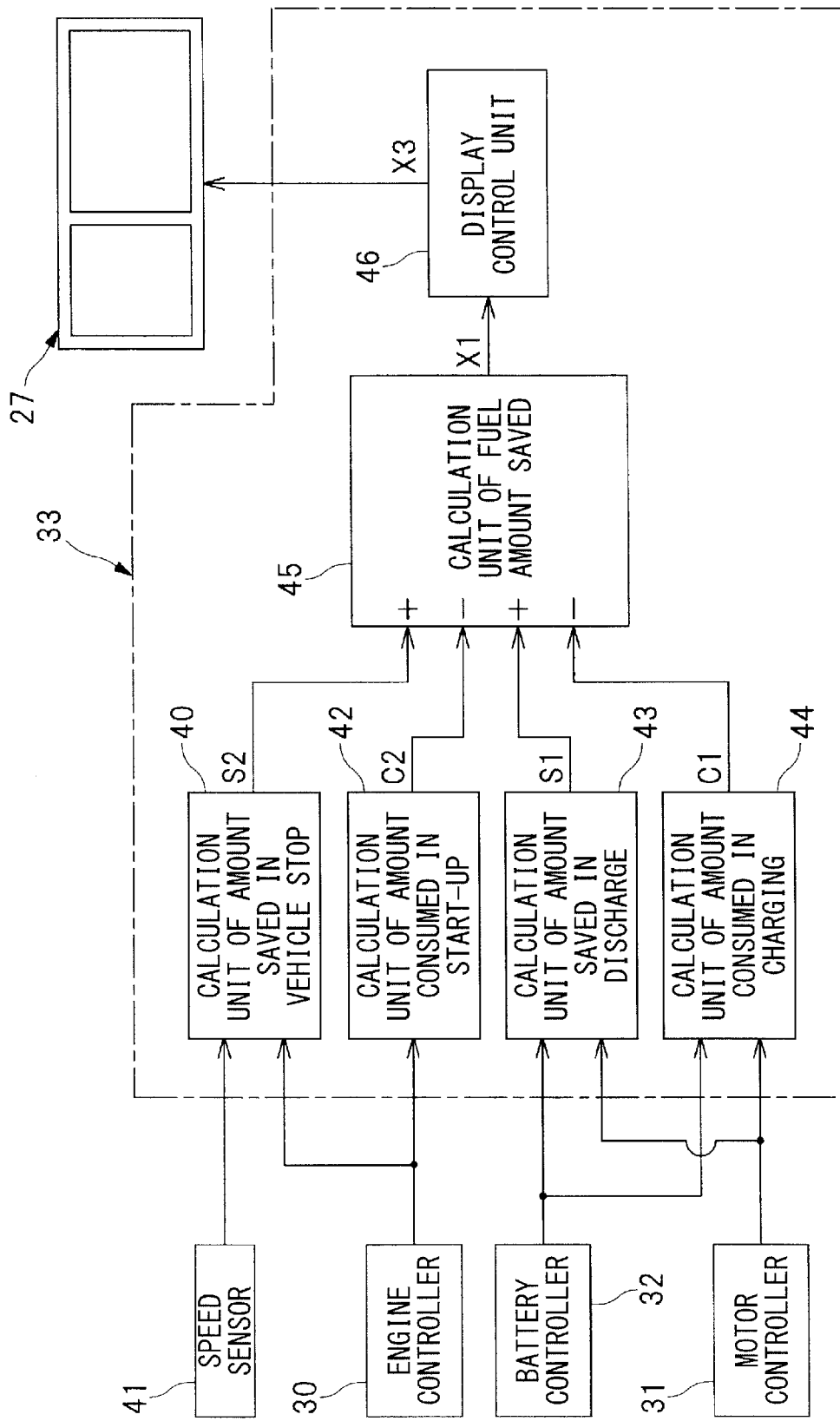
FIG. 4 is a block diagram of some of functions of a display controller.

Description is now given on a calculation procedure of the fuel amount saved. FIG. 4 is a block diagram of some of functions of the display controller 33. Referring to FIG. 4, the display controller 33 may include a calculation unit of an amount saved in vehicle stop 40. In one implementation, the calculation unit of the amount saved in vehicle stop 40 may serve as a "second saving amount calculator". The calculation unit of the amount saved in vehicle stop 40 may calculate a fuel amount saved in vehicle stop S2 that is accompanied by the engine stop. In one implementation, the fuel amount saved in vehicle stop S2 may serve as a "second fuel amount saved". In the hybrid vehicle 11, the engine 13 is basically kept from idling, making it possible to save fuel to be consumed in idling. The calculation unit of the amount saved in vehicle stop 40 may therefore calculate the fuel amount saved S2 that is saved owing to the engine stop in the vehicle stop, as fuel consumption reduced owing to hybridization. The calculation unit of the amount saved in vehicle stop 40 may receive vehicle speed information from a speed sensor 41, and may receive engine stop information from the engine controller 30. The calculation unit of the amount saved in vehicle stop 40 may calculate the fuel amount saved S2 that is saved owing to the engine stop, when the vehicle speed is equal to or lower than a setting value and the engine 13 is stopped. In one specific but non-limiting instance, the calculation unit of the amount saved in vehicle stop 40 may calculate the fuel amount saved S2, when the vehicle speed is equal to or lower than a predetermined setting value (e.g. 0 km/h) and the engine 13 is stopped. The calculation unit of the amount saved in vehicle stop 40 may multiply a fuel amount saved per unit time F1 by the engine stopping time T1, based on the following expression (1), to calculate the fuel amount saved S2 that is saved owing to the engine stop. The fuel amount saved per unit time F1 may be a fixed constant as an idle fuel flow rate after an engine warming-up in an engine vehicle. The engine vehicle assumed in setting of the fuel amount saved per unit time F1 may be an engine vehicle mounted with an engine equivalent to the engine 13 mounted on the hybrid vehicle 11. Note that the fuel amount saved S2 may be calculated as "zero (0)" when the hybrid vehicle 11 is travelling or when the engine 13 is on operation.

$$S2[\text{cc}] = F1[\text{cc/sec}] \times T1[\text{sec}] \qquad (1)$$

The display controller 33 may include a calculation unit of an amount consumed in start-up 42. In one implementation, the calculation unit of the amount consumed in start-up 42 may serve as a "second consumption amount calculator". The calculation unit of the amount consumed in start-up 42 may calculate a fuel amount consumed in engine start-up C2. In one implementation, the fuel amount consumed in engine start-up C2 may serve as a "second fuel amount consumed". In the hybrid vehicle 11, the engine 13 may be repetitively stopped and restarted in response to, for example, a driving force required by a driver. Also, when the engine 13 is started up, fuel injection from an injector may be increased in quantity. The calculation unit of the amount consumed in start-up 42 may therefore calculate the fuel amount consumed in engine start-up C2 that is consumed owing to the engine start-up, as fuel consumption increased owing to hybridization. The calculation unit of the amount consumed in start-up 42 may receive engine start-up information from the engine controller 30. The calculation unit of the amount consumed in start-up 42 may multiply a fuel amount consumed per unit number of times F2 by the number of times of the engine start-up N, based on the following expression (2), to calculate the fuel amount consumed in engine start-up C2 that is consumed owing to the engine start-up. Note that the fuel amount consumed C2 may be calculated as "zero (0)" when there is no engine start-up.

$$C2[\text{cc}] = F2[\text{cc/time}] \times N[\text{times}] \qquad (2)$$

The display controller 33 may include a calculation unit of an amount saved in discharge 43. In one implementation, the calculation unit of the amount saved in discharge 43 may serve as a "first saving amount calculator". The calculation unit of the amount saved in discharge 43 may calculate a fuel amount saved in battery discharge S1. In one implementation, the fuel amount saved in battery discharge S1 may serve as a "first fuel amount saved". The hybrid vehicle 11 includes, as drive sources, not only the engine 13 but also the second motor generator MG2. To allow the battery 21 to discharge to drive the second motor generator MG2 makes it possible to reduce the engine load and to reduce fuel consumption. The calculation unit of the amount saved in discharge 43 may therefore calculate the fuel amount saved S1 that is saved owing to battery discharge, as fuel consumption reduced owing to hybridization. The calculation unit of the amount saved in discharge 43 may receive, from the battery controller 32, electrical power Pbd discharged by the battery 21, and may receive, from the motor controller 31, power consumption Pm1 of the first motor generator MG1. The calculation unit of the amount saved in discharge 43 may calculate the fuel amount saved S1 that is saved owing to the battery discharge, based on the following expression (3). Note that, in the expression (3), "T2" denotes sampling time, "Ee" denotes engine efficiency, and "Fc" denotes a fuel heat generation value. The fuel amount saved S1 may be calculated as "zero (0)" in the battery charging.

$$S1[\text{cc}] = \{(Pbd[\text{kW}] - Pm1[\text{kW}]) \times T2[\text{sec}]\} \div \{Ee[\%] \div 100 \times Fc[\text{kJ/cc}]\} \qquad (3)$$

The display controller 33 may include a calculation unit of an amount consumed in charging 44. In one implementation, the calculation unit of the amount consumed in charging 44 may serve as a "first consumption amount calculator". The calculation unit of the amount consumed in charging 44 may calculate a fuel amount consumed C1 that is consumed in the battery charging. In one implementation, the fuel amount consumed C1 may serve as a "first fuel amount consumed". Non-limiting examples of charging of the battery 21 may include regenerative braking by means of the second motor generator MG2, and driving of the first motor generator MG1 by the engine 13 to allow the first motor generator MG1 to generate electrical power. As described, fuel consumption may be reduced owing to the battery discharge. However, when the battery power is obtained by driving of the first motor generator MG1 for power generation, it is necessary to subtract a fuel amount consumed by the engine 13 from the fuel amount saved S1. From this viewpoint, the calculation unit of the amount consumed in charging 44 may calculate the fuel amount consumed C1 that is consumed owing to the battery charging, as fuel consumption increased owing to hybridization. The calculation unit of the amount consumed in charging 44 may receive, from the battery controller 32, electrical power Pbc charged in the battery 21, and may receive, from the motor controller 31, regenerative power Pm2 of the second motor generator MG2. The calculation unit of the amount consumed in charging 44 may calculate the fuel amount consumed C1 that is consumed owing to the battery charging, based on the following expression (4), in the battery charging. Note that, in the expression (4), "T2" denotes the sampling time, "Ee" denotes the engine efficiency, and "Fc" denotes the fuel heat generation value, similarly to the forgoing expression (3). The fuel amount consumed C1 may be calculated as "zero (0)" in the battery discharge.

$$C1[\text{cc}] = \{(Pbc[\text{kW}] - Pm2[\text{kW}]) \times T2[\text{sec}]\} \div \{Ee[\%] \div 100 \times Fc[\text{kJ/cc}]\} \qquad (4)$$

The display controller 33 may include a calculation unit of a fuel amount saved 45. In one implementation, the calculation unit of the fuel amount saved 45 may serve as a "saving balance calculator". The calculation unit of the fuel amount saved 45 may receive the fuel amount saved S1, the fuel amount saved S2, the fuel amount consumed C1, and the fuel amount consumed C2, from the calculation units 40 and 42 to 44. Then, the calculation unit of the fuel amount saved 45 may calculate, based on the following expression (5), an instantaneous amount saved X1 that is saved owing to hybridization, by adding up a value obtained by subtracting the fuel amount consumed C2 from the fuel amount saved S2 and a value obtained by subtracting the fuel amount consumed C1 from the fuel amount saved S1. The instantaneous amount saved X1 may be a short-term fuel amount saved that may be calculated for each predetermined operation cycle. In one implementation, the operation cycle may serve as a "calculation period". The instantaneous amount saved X1 calculated may fall on saved side or on consumed side for each operation cycle. For example, when an accelerator pedal is significantly stepped down in stable travelling to cause the start-up of the engine 13, the instantaneous amount saved X1 calculated may fall on the consumed side (on negative side). Meanwhile, when the accelerator pedal is slightly stepped down to cause the stop of the engine 13, the instantaneous amount saved X1 calculated may fall on the saved side (on positive side). In one implementation, the instantaneous amount saved X1 may serve as a "fuel saving balance".

$$X1[cc]=(S2[cc]-C2[cc])+(S1[cc]-C1[cc]) \qquad (5)$$

Figure 5:
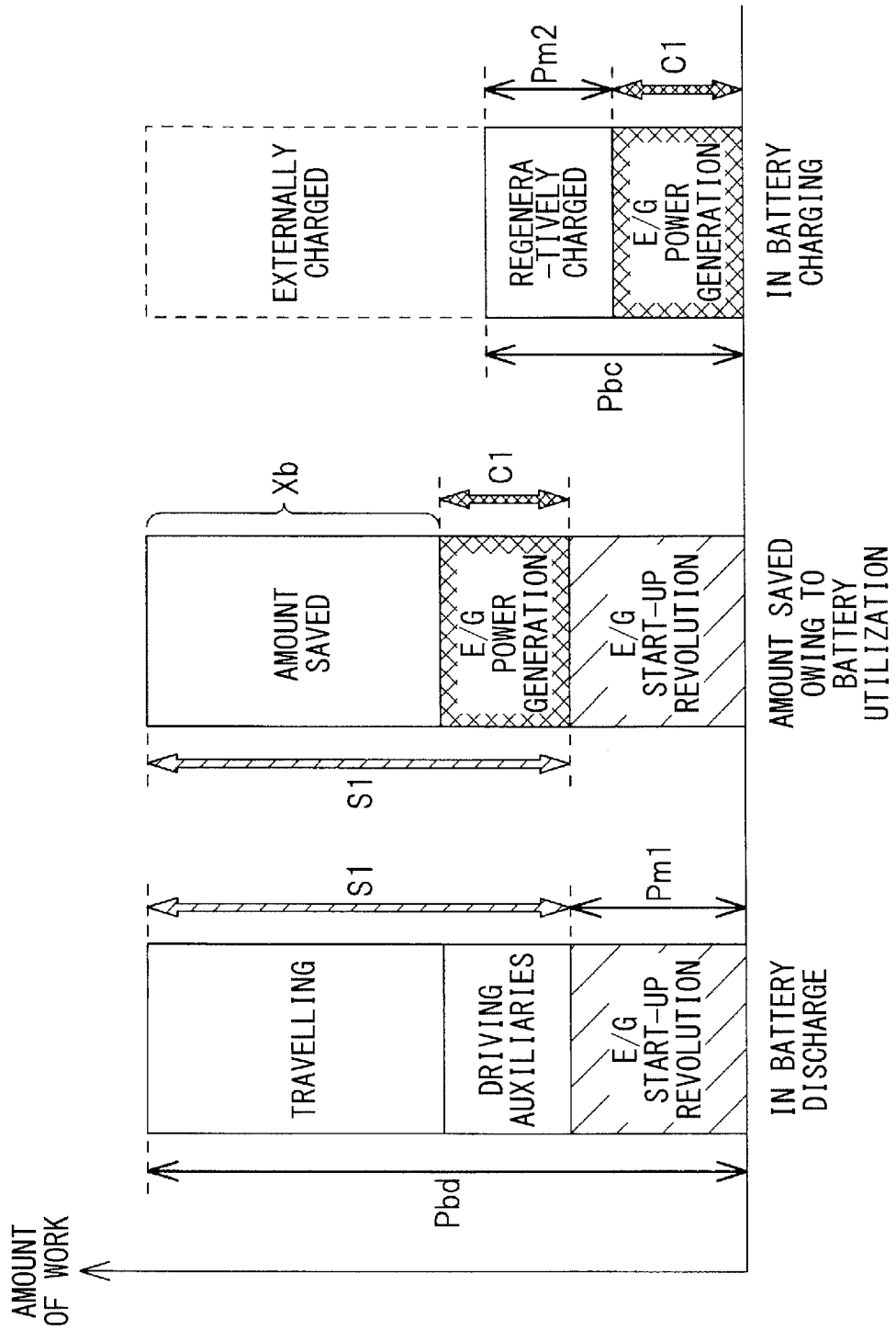
FIG. 5 illustrates an amount of work saved owing to battery utilization.
Figure 6:
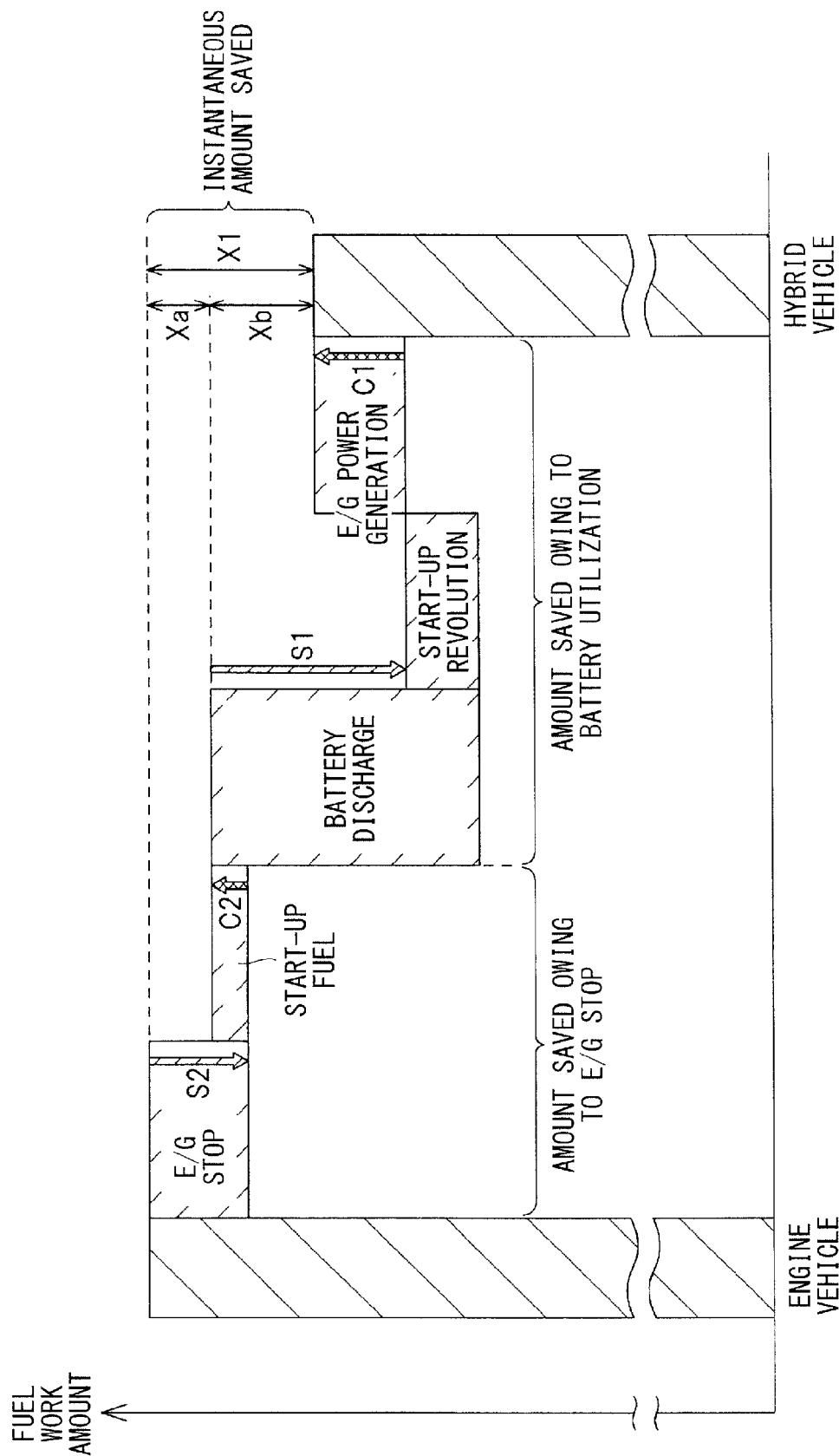
FIG. 6 illustrates details of an instantaneous amount saved.

FIG. 5 illustrates an amount of work saved owing to battery utilization. FIG. 6 illustrates details of the instantaneous amount saved X1. Note that references S1, S2, C1, and C2 in FIGS. 5 and 6 respectively denote the fuel amount saved S1, the fuel amount saved S2, the fuel amount consumed C1, and the fuel amount consumed C2 as described. FIG. 6 depicts the fuel amount saved S1, the fuel amount saved S2, the fuel amount consumed C1, and the fuel amount consumed C2. However, this is illustrative and non-limiting. For example, when the battery charging is continued during the operation cycle, the fuel amount saved S1 may become "zero (0)". When the battery discharge is continued during the operation cycle, the fuel amount consumed C1 may become "zero (0)". When the engine 13 is kept on operation during the operation cycle, the fuel amount saved S2 may become "zero (0)". When the engine 13 is kept stopped during the operation cycle, the fuel amount consumed C2 may become "zero (0)".

Referring to FIG. 5, in the battery discharge, an amount of work corresponding to the power consumption Pml of the first motor generator MG1 may be subtracted from an amount of work corresponding to the electrical power Pbd discharged by the battery 21. Thus, an amount of work corresponding to the fuel amount saved S1 may be calculated. The amount of work corresponding to the fuel amount saved S1, i.e., an amount of work saved owing to hybridization, may include an amount of work that involves travelling and driving auxiliaries by means of the second motor generator MG2. Meanwhile, in the battery charging, an amount of work corresponding to the regenerative power Pm2 of the second motor generator MG2 may be subtracted from an amount of work corresponding to the electrical power Pbc charged in the battery 21. Thus, an amount of work corresponding to the fuel amount consumed C1 may be calculated. The amount of work corresponding to the fuel amount consumed C1, i.e., an amount of work increased owing to hybridization, may include an amount of work done by the engine 13 in driving the first motor generator MG1 to allow the first motor generator MG1 to generate electrical power. The amount of work corresponding to the fuel amount consumed C1 may be subtracted from the amount of work corresponding to the fuel amount saved S1. Thus, an amount of work corresponding to the short-term fuel amount saved Xb, i.e., the instantaneous amount saved Xb, may be calculated. The amount of work corresponding to the instantaneous amount saved Xb may be the amount of work saved owing to the battery utilization, i.e., the amount of work saved owing to hybridization.

Referring to FIG. 6, an amount of work corresponding to the fuel amount consumed C2 may be subtracted from an amount of work corresponding to the fuel amount saved S2. Thus, an amount of work corresponding to the short-term fuel amount saved Xa, i.e., the instantaneous amount saved Xa, may be calculated. Also, the amount of work corresponding to the fuel amount consumed C1 may be subtracted from the amount of work corresponding to the fuel amount saved S1. Thus, the amount of work corresponding to the short-term fuel amount saved Xb, i.e., the instantaneous amount saved Xb, may be calculated. In other words, as given in the forgoing expression (5), the instantaneous amount saved X1 that is saved owing to hybridization may be calculated by adding up the value obtained by subtracting the fuel amount consumed C2 from the fuel amount saved S2 and the value obtained by subtracting the fuel amount consumed C1 from the fuel amount saved S1.

As described so far, the display controller 33 may calculate the fuel amount saved S1, based on the electrical power Pbd discharged by the battery 21, may calculate the fuel amount consumed C1, based on the electrical power Pbc charged in the battery 21, and may calculate the instantaneous amount saved X1, based on the fuel amount saved S1 and the fuel amount consumed C1. Hence, it is possible to precisely calculate the instantaneous amount saved X1, that is, the short-term fuel amount saved, without using complicated map data. The elimination of complicated map data makes it possible to restrain development costs of the vehicle control apparatus 10, allowing for easy application of the vehicle control apparatus 10 to various vehicle models. Moreover, in the forgoing description, the instantaneous amount saved X1 may be calculated based on the fuel amount saved S1, the fuel amount saved S2, the fuel amount consumed C1, and the fuel amount consumed C2. However, this is illustrative and non-limiting. For example, the instantaneous amount saved X1 may be calculated based on the fuel amount saved S1 and the fuel amount consumed C1. Alternatively, the instantaneous amount saved X1 may be calculated based on the fuel amount saved S1, the fuel amount saved S2, and the fuel amount consumed C1. In another alternative, the instantaneous amount saved X1 may be calculated based on the fuel amount saved S1, the fuel amount consumed C1, and the fuel amount consumed C2.

[Display on Display]

Figure 7:
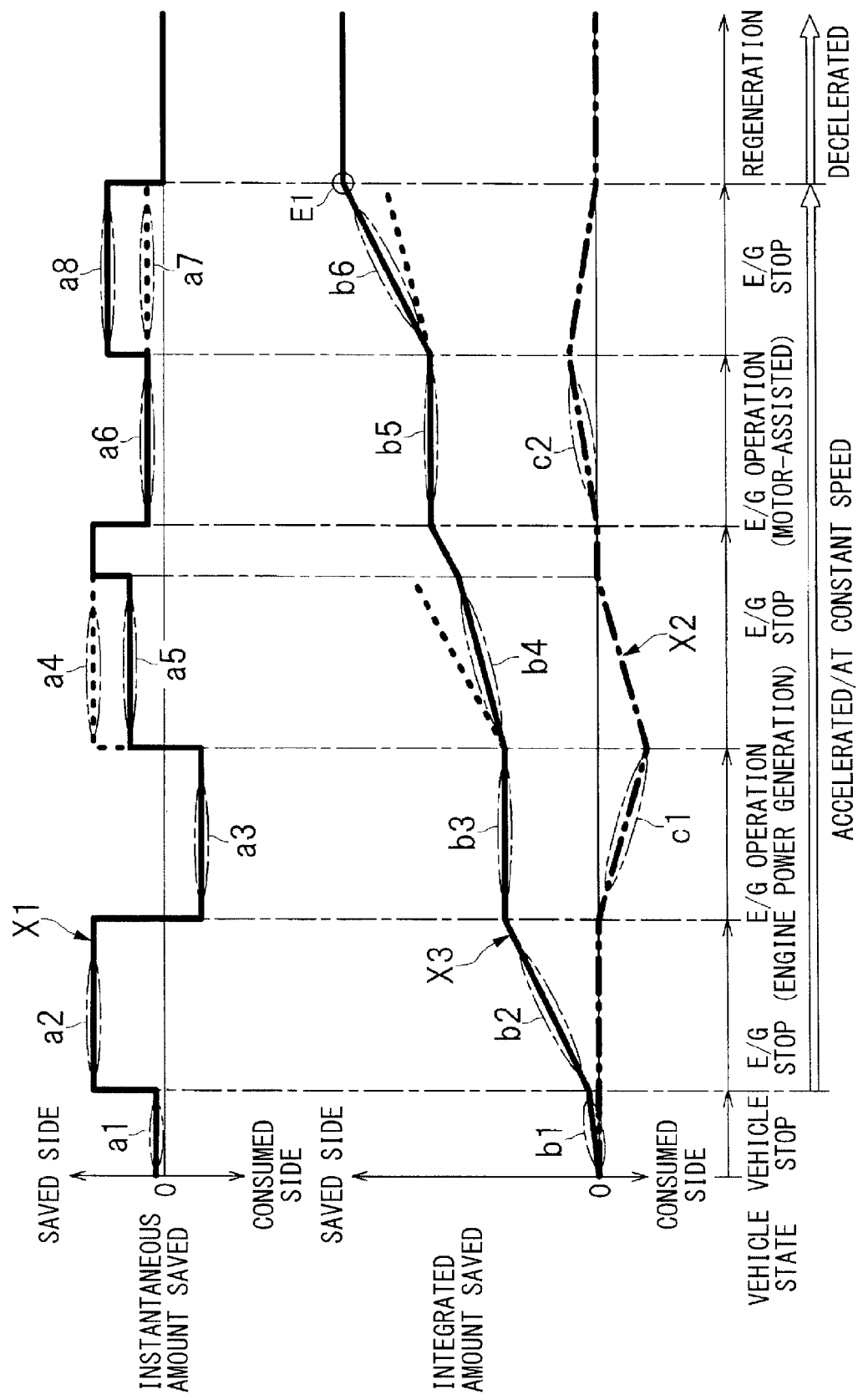
FIG. 7 is a timing chart of an example of a display state of an integrated amount saved, provided by the display controller.

Description is given next on a display procedure of the fuel amount saved on the display 27. As illustrated in FIG. 4, the display controller 33 may include a display control unit 46. The display control unit 46 may calculate, based on the instantaneous amount saved X1, an integrated amount saved X3 to be displayed on the display. In one implementation, the integrated amount saved X3 may serve as "fuel saving information". Here, FIG. 7 is a timing chart of an example of a display state of the integrated amount saved X3, provided by the display controller 33. Note that FIG. 7 depicts a state in which the hybrid vehicle 11 is started, performs acceleration travelling and constant-speed travelling, and thereafter is decelerated due to the regenerative braking.

Referring to FIG. 7, since the engine 13 is stopped in the vehicle stop, the instantaneous amount saved X1 calculated may fall on the saved side (a reference a1). When the instantaneous amount saved X1 calculated falls on the saved side, the display controller 33 may add the instantaneous amount saved X1 to latest integrated amount saved X3 to update the integrated amount saved X3 to be displayed on the display 27. In FIG. 7, the instantaneous amount saved X1 calculated may fall on the saved side as a small value (the reference a1). It follows, therefore, that the integrated amount saved X3 may increase mildly (a reference b1). Then, the accelerator pedal is mildly stepped down, causing execution of the motor travelling in which the second motor generator MG2 is driven with the engine 13 kept stopped. In the motor travelling, the instantaneous amount saved X1 calculated may fall on the saved side as a large value (a reference a2). It follows, therefore, that the integrated amount saved X3 may increase rapidly (a reference b2).

Subsequently, the first motor generator MG1 may be driven by the engine 13, causing the instantaneous amount saved X1 calculated to fall on the consumed side (a reference a3). When the instantaneous amount saved X1 calculated falls on the consumed side, the display controller 33 does not update the integrated amount saved X3 with use of the instantaneous amount saved X1. Instead, the display controller 33 may integrate the instantaneous amount saved X1 calculated, and may allow an integration result to be stored as a temporary amount stored X2. In one implementation, the temporary amount stored X2 may serve as an "integration result". In other words, when the instantaneous amount saved X1 calculated falls on the consumed side, the display controller 33 may integrate the instantaneous amount saved X1 unreflected in the integrated amount saved X3, and may allow the integration result to be stored as the temporary amount stored X2. In this case, the integrated amount saved X3 to be displayed on the display 27 may be maintained at a latest value (a reference b3), while the temporary amount stored X2 may increase on the consumed side (a reference c1). Thus, when the instantaneous amount saved X1 calculated falls on the consumed side, the integrated amount saved X3 may be maintained at the latest value. This makes it possible to restrain an occupant from having a sense of incongruity.

Then, when the engine 13 is stopped again, causing transition to the motor travelling, the instantaneous amount saved X1 calculated may fall on the saved side as a large value (a reference a4). In this case, the temporary amount stored X2 that has been integrated on the consumed side may be subtracted from the instantaneous amount saved X1 (a reference a5). Hence, it is possible to restrain a rapid increase in the integrated amount saved X3 (a reference b4). In other words, when the temporary amount stored X2 has been integrated, an amount of increase in the integrated amount saved X3 may be corrected based on the temporary amount stored X2. Hence, it is possible to allow the instantaneous amount saved X1 that remains unreflected in the integrated amount saved X3 to be reflected, at a shifted timing, in the integrated amount saved X3. This allows for enhanced precision of calculation of the integrated amount saved X3. In one implementation, the amount of increase in the integrated amount saved X3 may serve as an "amount of update" of the "fuel saving information".

Subsequently, motor-assisted travelling may be performed in which the one or more wheels 15 may be driven by the engine 13 and the second motor generator MG2. In the motor-assisted travelling, the instantaneous amount saved X1 calculated may fall on the saved side (a reference a6). Even when the instantaneous amount saved X1 calculated falls on the saved side, the display controller 33 does not update the integrated amount saved X3 with use of the instantaneous amount saved X1, if the engine 13 is on operation. Instead, the display controller 33 may integrate the instantaneous amount saved X1 calculated, and may allow the integration result to be stored as the temporary amount stored X2. In other words, when the engine 13 is on operation, the display controller 33 may integrate the instantaneous amount saved X1 unreflected in the integrated amount saved X3, and may allow the integration result to be stored as the temporary amount stored X2. In this case, the integrated amount saved X3 to be displayed on the display 27 may be maintained at the latest value (a reference b5), and the temporary amount stored X2 may increase on the saved side (a reference c2). Thus, when the engine 13 is on operation and the fuel is being consumed, the integrated amount saved X3 may be maintained at the latest value. Hence, it is possible to restrain an occupant from having the sense of incongruity.

When the engine 13 is stopped again to cause the transition to the motor travelling, the instantaneous amount saved X1 calculated may fall on the saved side (a reference a7). In this case, the temporary amount stored X2, i.e., the integration result on the saved side, may be added to the instantaneous amount saved X1 (a reference a8). This causes a significant increase in the integrated amount saved X3 (a reference b6). In other words, when the temporary amount stored X2 has been integrated, the amount of increase in the integrated amount saved X3 may be corrected based on the temporary amount stored X2. Hence, it is possible to allow the instantaneous amount saved X1 that remains unreflected in the integrated amount saved X3 to be reflected, at the shifted timing, in the integrated amount saved X3. This leads to the enhanced precision of the calculation of the integrated amount saved X3.

As described, the display controller 33 may control the integrated amount saved X3 to be displayed on the display 27, in response to a calculation state of the instantaneous amount saved X1 and an operation state of the engine 13. Specifically, when the instantaneous amount saved X1 calculated falls on the saved side, the integrated amount saved X3 may be updated based on the instantaneous amount saved X1. Meanwhile, when the instantaneous amount saved X1 calculated falls on the consumed side, the integrated amount saved X3 may be maintained at the latest value, instead of being updated. Moreover, when the engine 13 is stopped, the integrated amount saved X3 may be updated based on the instantaneous amount saved X1. Meanwhile, when the engine 13 is on operation, the integrated amount saved X3 may be maintained at the latest value, instead of being updated. Hence, it is possible to provide appropriate display of the integrated amount saved X3 on the display 27, making it possible to restrain an occupant from having the sense of incongruity.

Furthermore, there may be a case in which the integrated amount saved X3 to be displayed on the display 27 is not updated in response to the calculation state of the instantaneous amount saved X1 and the operation state of the engine 13. In this case, the instantaneous amount saved X1 unreflected in the integrated amount saved X3 may be integrated, and the integration result may be stored as the temporary amount stored X2. When the temporary amount stored X2 has been integrated, the amount of increase in the integrated amount saved X3 may be corrected based on the temporary amount stored X2, in updating the integrated amount saved X3 to be displayed on the display 27. Hence, it is possible to allow the instantaneous amount saved X1 that remains unreflected in the integrated amount saved X3 to be reflected, at the shifted timing, in the integrated amount saved X3. This allows for the enhanced precision of the calculation of the integrated amount saved X3.

[Flowcharts]

Figure 8:
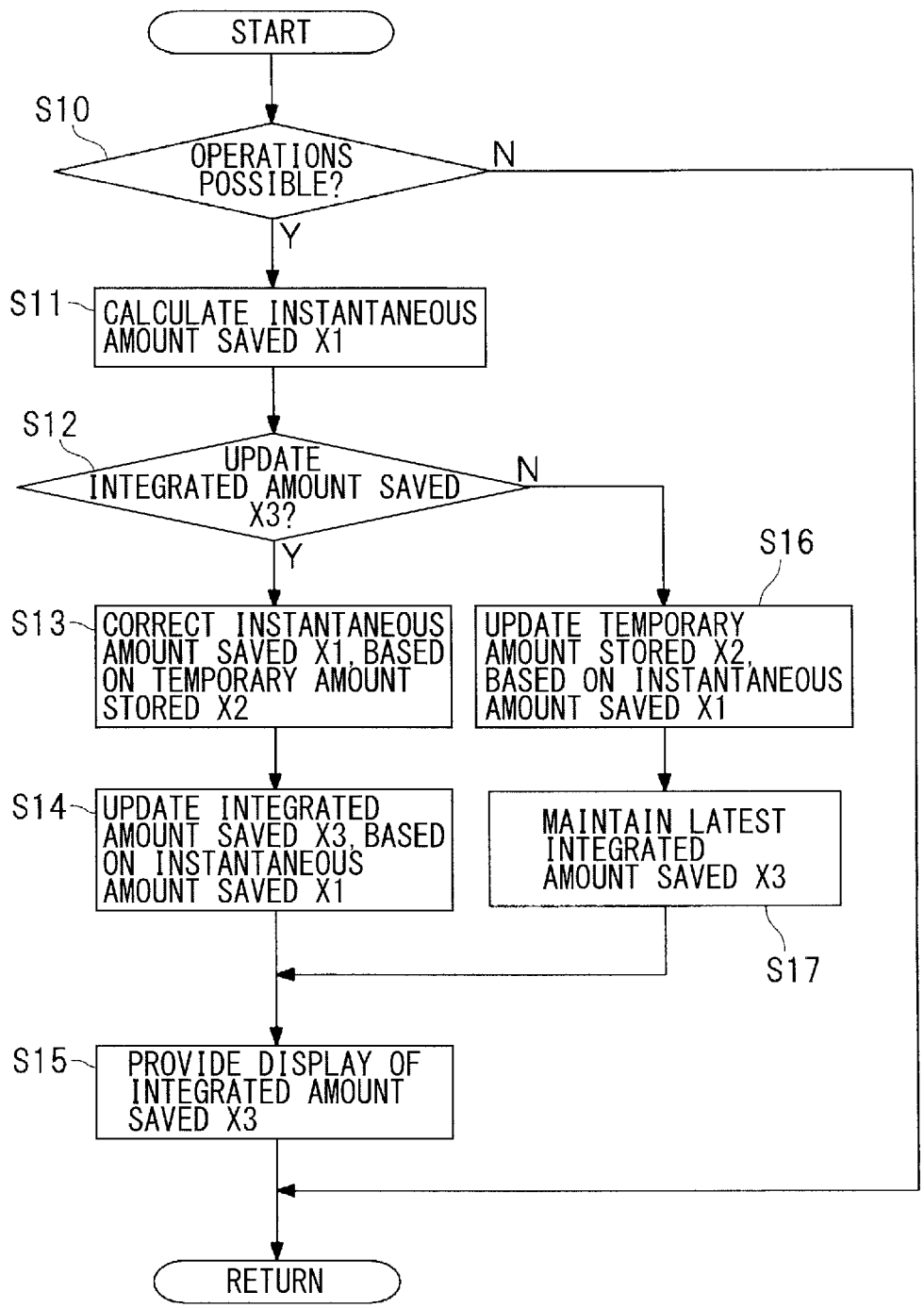
FIG. 8 is a flowchart of an example of a display procedure of the integrated amount saved.
Figure 9:
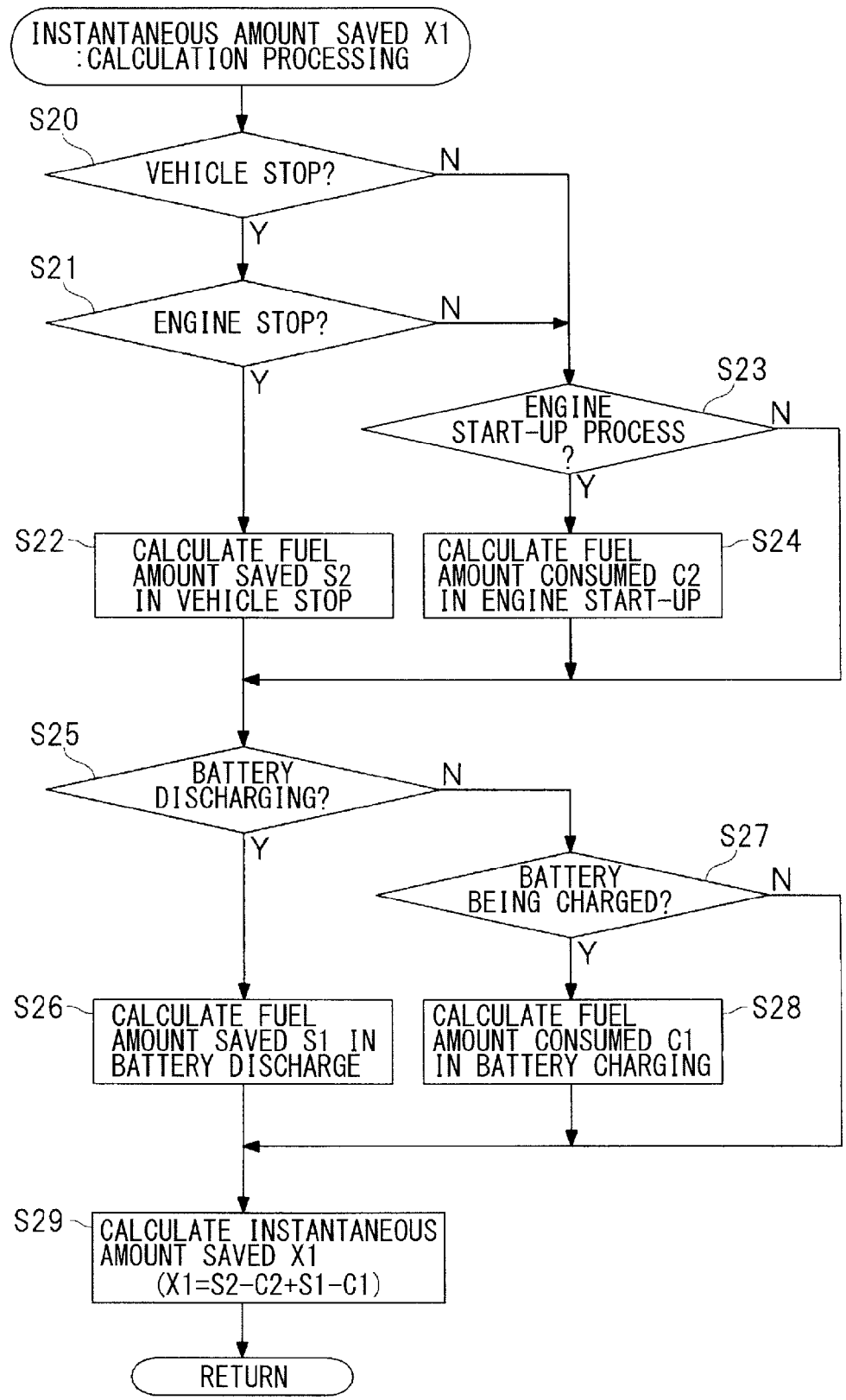
FIG. 9 is a flowchart of an example of a calculation procedure of the instantaneous amount saved.

In the following, description is given, with reference to flowcharts, on a display procedure of the integrated amount saved X3 and a calculation procedure of the instantaneous amount saved X1. FIG. 8 is a flowchart of one example of the display procedure of the integrated amount saved X3. FIG. 9 is a flowchart of one example of the calculation procedure of the instantaneous amount saved X1.

Referring to FIG. 8, in step S10, a determination may be made as to whether or not operations of the instantaneous amount saved X1 are possible. In step S10, when information used in the operations of the instantaneous amount saved X1 is determined as abnormal, the routine is finished without executing the operations of the instantaneous amount saved X1. Non-limiting examples of the information used in the operations of the instantaneous amount saved X1 may include information on the operation of the engine 13, and information on the charging and the discharge of the battery 21. Meanwhile, in step S10, when the information used in the operations of the instantaneous amount saved X1 is determined as normal, the flow may proceed to step S11. In step S11, the instantaneous amount saved X1 may be calculated that may serve as a base of the integrated amount saved X3 to be displayed on the display 27. Note that the calculation procedure of the instantaneous amount saved X1 is described below with reference to FIG. 9.

Referring to FIG. 9, in step S20, a determination may be made as to whether or not the hybrid vehicle 11 is stopped. In step S20, when the hybrid vehicle 11 is determined as being stopped, the flow may proceed to step S21. In step S21, a determination may be made as to whether or not the engine 13 is stopped. In step S21, when the engine 13 is determined as being stopped, the flow may proceed to step S22. In step S22, the fuel amount saved S2 may be calculated that is saved in the vehicle stop accompanied by the engine stop. Meanwhile, in step S20, when the hybrid vehicle 11 is determined as not being stopped, the flow may proceed to step S23. Also, in step S21, when the engine 13 is determined as not being stopped, the flow may proceed to step S23 as well. In step S23, a determination may be made as to whether or not the engine 13 is in a start-up process. In step S23, when the engine 13 is determined as being in the start-up process, the flow may proceed to step S24. In step S24, the fuel amount consumed C2 may be calculated that is consumed in the engine start-up.

Then, the flow may proceed to step S25, in which a determination is made as to whether or not the battery 21 is discharging. In step S25, when the battery 21 is determined as being discharging, the flow may proceed to step S26, in which the fuel amount saved S1 may be calculated that is saved in the battery discharge. Meanwhile, in step S25, when the battery 21 is determined as not being discharging, the flow may proceed to step S27, in which a determination is made as to whether or not the battery 21 is being charged. In step S27, when the battery 21 is determined as being charged, the flow may proceed to step S28, in which the fuel amount consumed C1 may be calculated that is consumed in the battery charging. In subsequent step S29, the instantaneous amount saved X1 may be calculated based on the fuel amount saved S1, the fuel amount saved S2, the fuel amount consumed C1, and the fuel amount consumed C2.

Back to FIG. 8, in step S11, the instantaneous amount saved X1 may be calculated. Then, the flow may proceed to step S12, in which a determination may be made as to whether or not there is a situation that the integrated amount saved X3 to be displayed on the display may be updated. In step S12, when the instantaneous amount saved X1 calculated falls on the saved side, or when the engine 13 is stopped, there is a situation that the integrated amount saved X3 may be updated based on the instantaneous amount saved X1. The flow may therefore proceed to step S13, in which the instantaneous amount saved X1 may be corrected based on the temporary amount stored X2. Next, in step S14, the instantaneous amount saved X1 may be added to the latest integrated amount saved X3, allowing the integrated amount saved X3 to be updated. In subsequent step S15, the instantaneous amount saved X3 thus updated may be displayed on the display 27. Meanwhile, in step S12, when the instantaneous amount saved X1 calculated falls on the consumed side, or when the engine 13 is on operation, there is a situation that the latest integrated amount saved X3 may be maintained. The flow may therefore proceed to step S16, in which the instantaneous amount saved X1 may be added to the latest temporary amount stored X2, allowing the temporary amount stored X2 to be updated. Next, in step S17, the integrated amount saved X3 may be maintained at the latest value without being updated. In subsequent step S15, the integrated amount saved X3 thus maintained may be displayed on the display 27.

The technology is by no means limited to the implementations described above, and may be modified in variety of ways without departing from the scope of the subject matter of the technology. For example, as described, the vehicle control apparatus 10 may be provided in the plug-in hybrid vehicle 11. However, this is illustrative and non-limiting. The vehicle control apparatus may be provided in a hybrid vehicle that does not allow for charging with use of an external power supply. Moreover, in the forgoing description, the fuel amounts saved S1 and S2, and the fuel amounts consumed C1 and C2 may be calculated with use of the expressions (1) to (4). However, this is illustrative and non-limiting. The fuel amounts saved S1 and S2, and the fuel amounts consumed C1 and C2 may be calculated with use of other expressions.

In the forgoing description, the battery 21 may be adopted as the "power storage device". However, this is illustrative and non-limiting. A capacitor may be adopted as the "power storage device". Also, in the forgoing description, the display 27 is adopted as the "display". However, this is illustrative and non-limiting. An analog or digital meter may be adopted as the "display". Alternatively, a light-emitting body that may switch colors or light-emitting patterns in accordance with the integrated amount saved X3 may be adopted as the "display".

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus provided in a hybrid vehicle that includes a display, the vehicle control apparatus comprising:
  a first electric motor coupled to an engine;
  a second electric motor coupled to one or more wheels;
  a power storage device coupled to the first electric motor and the second electric motor through an electrical conduction path;
  a first consumption amount calculator that calculates, based on electrical power charged in the power storage device and electrical power regenerated by the second electric motor, a first fuel amount consumed by the engine owing to charging when the power storage device is charged;
  a first saving amount calculator that calculates, based on electrical power discharged by the power storage device, a first fuel amount saved by the engine owing to discharge when the power storage device is discharging;
  a saving balance calculator that calculates, based on the first fuel amount consumed and the first fuel amount saved, a fuel saving balance for each calculation period; and a display controller that controls, based on the fuel saving balance, fuel saving information to be displayed on the display.

2. The vehicle control apparatus according to claim 1,
wherein the first saving amount calculator calculates the first fuel amount saved, based on the electrical power discharged by the power storage device and electrical power consumed by the first electric motor.

3. The vehicle control apparatus according to claim 2, further comprising a second saving amount calculator that calculates a second fuel amount saved by the engine owing to an engine stop when a vehicle speed is equal to or lower than a setting value and the engine is stopped,
wherein the saving balance calculator calculates the fuel saving balance, based on the first fuel amount consumed, the first fuel amount saved, and the second fuel amount saved.

4. The vehicle control apparatus according to claim 3, further comprising a second consumption amount calculator that calculates a second fuel amount consumed by the engine owing to an engine start-up when the engine is started up,
wherein the saving balance calculator calculates the fuel saving balance, based on the first fuel amount consumed, the second fuel amount consumed, the first fuel amount saved, and the second fuel amount saved.

5. The vehicle control apparatus according to claim 2,
wherein the display controller updates, based on the fuel saving balance, the fuel saving information to be displayed on the display, when the fuel saving balance calculated falls on saved side, and
the display controller maintains latest fuel saving information, instead of updating the fuel saving information to be displayed on the display, when the fuel saving balance calculated falls on consumed side.

6. The vehicle control apparatus according to claim 5,
wherein the display controller integrates the fuel saving balance unreflected in the fuel saving information, and allows an integration result to be stored, when the display controller maintains the fuel saving information instead of updating the fuel saving information to be displayed on the display, and
the display controller corrects, based on the integration result stored, an amount of update of the fuel saving information to be displayed on the display, when the display controller updates, based on the fuel saving balance, the fuel saving information to be displayed on the display.

7. The vehicle control apparatus according to claim 2,
wherein the display controller updates, based on the fuel saving balance, the fuel saving information to be displayed on the display, when the engine is stopped, and
the display controller maintains latest fuel saving information, instead of updating the fuel saving information to be displayed on the display, when the engine is on operation.

8. The vehicle control apparatus according to claim 7,
wherein the display controller integrates the fuel saving balance unreflected in the fuel saving information, and allows an integration result to be stored, when the display controller maintains the fuel saving information instead of updating the fuel saving information to be displayed on the display, and
the display controller corrects, based on the integration result stored, an amount of update of the fuel saving information to be displayed on the display, when the display controller updates, based on the fuel saving balance, the fuel saving information to be displayed on the display.

9. The vehicle control apparatus according to claim 1, further comprising a second saving amount calculator that calculates a second fuel amount saved by the engine owing to an engine stop when a vehicle speed is equal to or lower than a setting value and the engine is stopped,
wherein the saving balance calculator calculates the fuel saving balance, based on the first fuel amount consumed, the first fuel amount saved, and the second fuel amount saved.

10. The vehicle control apparatus according to claim 9, further comprising a second consumption amount calculator that calculates a second fuel amount consumed by the engine owing to an engine start-up when the engine is started up,
wherein the saving balance calculator calculates the fuel saving balance, based on the first fuel amount consumed, the second fuel amount consumed, the first fuel amount saved, and the second fuel amount saved.

11. The vehicle control apparatus according to claim 1,
wherein the display controller updates, based on the fuel saving balance, the fuel saving information to be displayed on the display, when the fuel saving balance calculated falls on saved side, and
the display controller maintains latest fuel saving information, instead of updating the fuel saving information to be displayed on the display, when the fuel saving balance calculated falls on consumed side.

12. The vehicle control apparatus according to claim 11,
wherein the display controller integrates the fuel saving balance unreflected in the fuel saving information, and allows an integration result to be stored, when the display controller maintains the fuel saving information instead of updating the fuel saving information to be displayed on the display, and
the display controller corrects, based on the integration result stored, an amount of update of the fuel saving information to be displayed on the display, when the display controller updates, based on the fuel saving balance, the fuel saving information to be displayed on the display.

13. The vehicle control apparatus according to claim 1,
wherein the display controller updates, based on the fuel saving balance, the fuel saving information to be displayed on the display, when the engine is stopped, and
the display controller maintains latest fuel saving information, instead of updating the fuel saving information to be displayed on the display, when the engine is on operation.

14. The vehicle control apparatus according to claim 13,
wherein the display controller integrates the fuel saving balance unreflected in the fuel saving information, and allows an integration result to be stored, when the display controller maintains the fuel saving information instead of updating the fuel saving information to be displayed on the display, and
the display controller corrects, based on the integration result stored, an amount of update of the fuel saving information to be displayed on the display, when the display controller updates, based on the fuel saving balance, the fuel saving information to be displayed on the display.

* * * * *